United States Patent Office 3,446,859
Patented May 27, 1969

3,446,859
VAPOR PHASE CONDENSATION PROCESS
Edward D. Weil, Lewiston, and Hans L. Schlichting, Grand Island, N.Y., assignors to Hooker Chemical Corporation, Niagara Falls, N.Y., a corporation of New York
No Drawing. Filed June 11, 1962, Ser. No. 201,338
Int. Cl. C07c 21/18, 21/04
U.S. Cl. 260—654                                    5 Claims This invention is concerned with a novel process for the preparation of chloroallyl halides. More specifically, the instant invention relates to a novel vapor phase condensation process for the preparation of allyl halides having chlorine atoms in the $\beta$ and $\gamma$-positions.

The products of this invention are useful as nematocidal fumigants and intermediates for preparing thermostable lubricants, fire-retardant coatings and pesticides.

It is an object of this invention to prepare $\beta,\gamma$-chlorinated allyl halides by a vapor phase condensation process.

Another object of the instant invention is the provision of an economical method for the production of $\beta,\gamma$-chlorinated allyl halides.

These and other objects of the present invention will become more obvious from a consideration of the following detailed specification.

The novel process of the invention is represented in regard to stoichiometry by the following equation:

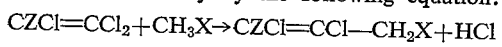

$$CZCl=CCl_2 + CH_3X \rightarrow CZCl=CCl—CH_2X + HCl$$

wherein X is a halogen chosen from the group consisting of fluorine, chlorine and bromine, and Z is hydrogen or chlorine. The preferred embodiment, because of superior yields, is that in which X and Z are both chlorine. Thus, the reactant olefin may be tetrachloroethylene or trichloroethylene, but, preferably, the former, and the reactant methyl halide may be methyl chloride, methyl bromide, or methyl fluoride, but, preferably, methyl chloride.

The reaction temperature is 400–700 degrees centigrade, preferably 450–670 degrees centigrade, since above 670 degrees centigrade, special materials of construction become necessary and excessive side-reactions occur, and below 450 degrees centigrade, the rate is unduly slow.

In carrying out the process of the instant invention, a tubular reactor is preferred since this type of design involves a large heat transfer area, thus allowing the reactants to rapidly reach the desired reaction temperature, and also assures maximum uniformity of retention time. The reactor may, if desired, be preceded by a separate feed vaporizer and preheater of conventional design, or the region of the reactor near the input end may be utilized for vaporizing and preheating the reactants. The reactants may be fed either in admixture or from separate feed lines. Feeding may be done by gravity feed, mechanical pumps, or carburetion into a carrier gas, or, in the case of the methyl halide, by permitting the substance to volatilize out of a cylinder of the liquefied or compressed methyl halide.

The reaction vessel or tube may be unpacked, but to facilitate heat transfer a packing may be used if desired. Inert gas diluents such as nitrogen, hydrogen chloride (which may be recycled from the product isolation part of the process) or carbon dioxide, although not essential to the operation, may be utilized if desired to facilitate heat transfer.

The process of the invention can be carried out in a reactor constructed from a variety of materials. However, the material of construction must be resistant to hydrogen chloride and to the haloorganic reactants and products at the reaction temperature. Illustrative examples of suitable materials include ceramics, graphite, glass, inert metals, various steels and the like.

Pressure is conveniently atmospheric or close to atmospheric, although the process is workable at sub-atmospheric or super-atmospheric pressures.

No catalyst is required, although the reaction appears to be of free-radical nature and is accelerated by substances which yield free radicals at the reaction temperature for example, small amounts of oxygen, chlorine, chlorine-yielding chlorocarbons and the like.

Retention times may vary considerably, for example, between about a fraction of a second up to several minutes, but 1 to 60 seconds is the preferred range. The ratio of reactants may be varied over a wide range. Equal quantities or excess of either reactant can be employed, the choice usually depending on relative costs and ease of recovery or recycle of the reactant used in excess. The process of our invention is surprising in that no serious loss of product results from self-condensation of either reactant. Some further reaction of the product, however, with either of the two reactants may occur, especially toward the outlet end of the reactor. For this reason, it has been found preferable to operate the process at low levels of conversion, a few percent up to 75 percent preferably, and to separate the unreacted starting materials from the product. These unreacted starting materials may be recovered and, if desired, may then be recycled to the reactor. The separation and recycling may be performed batch-wise or continuously. It is convenient to condense the entire effluent from the reactor, excepting the hydrogen chloride, by passing the effluent through a condenser cooled below the boiling point of the lower boiling reactant, then to fractionally distill the condensate in a continuous or batch still to separate the unreacting starting materials from the product. Alternatively, the effluent from the reactor may be fed directly to a condenser (held at such a temperature as to condense mainly the chloroallyl chloride product) or stripping column wherein the separation of the product (which is generally higher boiling) from the unreacted starting material is performed. The unreacted starting materials being uncondensed as they leave such a condenser or stripping column, may be separated from the hydrogen chloride by a second partial condenser, stripping column, or scrubbing column, and the unreacting starting materials then recycled. The condensation of the methyl halide may, if desired, be aided by passing the stream containing it through a compressor so as to raise its condensation point.

The process of the instant invention has an important economic advantage of requiring neither catalyst, nor elevated pressures. While catalysts are not required for efficient operation, favorable effects may be obtained by use of various sintered and porous materials having favorable surface characteristics. Further, another advantage resides in the one-step production of halide containing the $\beta,\gamma$-dichlorinated group.

The novel process of this invention not only involves a one-step preparation, but it utilizes inexpensive starting material or reactants, requires no catalysts, is especially adaptable to continuous commercial operation, and produces a useful hydrogen chloride as a by-product.

The following specific examples further illustrate the invention. However, this detailed disclosure is not to be construed as limiting the scope of the present invention.

EXAMPLE 1

Preparation of 2,3,3-trichloroallyl chloride 1400 g. tetrachloroethylene (8.5 moles) is fed continuously into a glass tube (three quarters of an inch in diameter, forty inches in length), packed with glass helices and heated to 580 degrees centigrade. The flow rate is adjusted so that 100–120 ml. are fed per hour. At the same time, 157 liters of methyl chloride (7 moles) are fed continuously from a cylinder into the same tube. The flow rate is adjusted by a rotameter so that 18–20 liters are fed per hour. The calculated retention time of the reaction mixture is 3–4 seconds. The reactor effluent is passed through a water cooled condenser (T=15 degrees centigrade) and the reaction product, the excess of tetrachloroethylene and a part of the methyl chloride are condensed. The other part of methyl chloride is condensed in a Dry-Ice trap. The formed hydrogen chloride passes through the condenser and is dissolved at the end in a water-filled trap. Titration of the trap water shows the presence of 1.0 mole hydrogen chloride, which indicates a 12 percent conversion calculated on the amount of tetrachloroethylene fed.

The condensate is fractionally distilled, recovering the unreacted methyl chloride and tetrachloroethylene from the obtained 2,3,3-trichloroallyl chloride, B.P. (12 mm.) 62–63 degrees centigrade; $D_{425}$ 1.5511; $N_D25$ 1.5192; yield 74 g. (41 percent based on conversion). The purity is confirmed by vapor phase chromatography (better than 99 percent).

*Analysis.*—Calculated for $C_3H_2Cl_4$: Cl, 78.8 percent. Found: Cl, 78.4 percent.

EXAMPLE 2

Using the same amount of tetrachloroethylene and methyl chloride described in Example 1, the mixture is fed into an empty glass tube (three quarters of an inch in diameter, and forty inches in length), heated to 620–640 degrees centigrade. Applying the same flow rate yields a retention time of 6–8 seconds and 0.5 mole of hydrogen chloride is trapped, indicating a conversion of 6 percent based on tetrachloroethylene fed. A distillation of the condensate yields 73 g. of 2,3,3-trichloroallyl chloride (84 percent of theory, calculated on the tetrachloroethylene converted). The purity found by vapor phase chromatography is 97 percent.

Various changes and modifications may be made in the method and apparatus of this invention, certain preferred forms of which have been herein described, without departing from the spirit and scope of this invention.

We claim:
1. A process for the production of a chlorinated allyl halide of the formula

$CZCl=CCl-CH_2X$ comprising contacting in the vapor phase in a reaction vessel packed with glass a chlorinated olefin of the formula

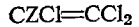
$CZCl=CCl_2$ wherein X is selected from the group consisting of fluorine, chlorine, and bromine and wherein Z is selected from the group consisting of chlorine and hydrogen, with a reactant selected from the group consisting of methyl chloride, methyl fluoride and methyl bromide, at a temperature from about 400 to 700 degrees centigrade, for a sufficient period of time from 1 to 60 seconds to effect a low level of conversion of the reactants to the desired chlorinated allyl halide, $CZCl=CCl-CH_2X$.

2. The process of claim 1 wherein the operating temperature is from about 450 to 670 degrees centigrade.

3. The process of claim 2 wherein a vapor phase reaction effluent is drawn off and partially condensed, the condensate is fractionally distilled, the unreacted starting material is recovered from the condensate overhead after fractional distillation thereof for recycle to the reaction zone, and the reaction product is isolated from the condensate residue.

4. The process of claim 3 wherein X is chlorine, Z is chlorine and the methyl halide employed is methyl chloride, and the product obtained, 2,3,3-trichloroallyl chloride, is of a purity greater than 99 percent.

5. The process of claim 4 wherein the reaction temperature is about 580 degrees centigrade, the retention time is 3 to 4 seconds and an excess of tetrachloroethylene is employed.

References Cited

UNITED STATES PATENTS 3,047,639    7/1962    Cunningham et al.

OTHER REFERENCES

Petrov et al., "Doklady Akad. Nauk SSSR," vol. 131, pp. 1098–1101 (1960) (copy in Pat. Off. Sci. Lib. Q60.A4).

LEON ZITVER, *Primary Examiner.*

HOWARD T. MARS, *Assistant Examiner.*

U.S. Cl. X.R.

260—653.3